(12) United States Patent
Jur et al.

(10) Patent No.: US 7,420,132 B2
(45) Date of Patent: Sep. 2, 2008

(54) BUSWAY PLUG FITTING CONTAINING AN OPERATING MECHANISM WITH A REVERSE LINK

(75) Inventors: Arthur J. Jur, Greenwood, SC (US); Stephen W. Oneufer, Greenwood, SC (US); Phillip D. Miller, Greenwood, SC (US)

(73) Assignee: Eaton Corporation, Cleveland, OH (US)

( * ) Notice: Subject to any disclaimer, the term of this patent is extended or adjusted under 35 U.S.C. 154(b) by 18 days.

(21) Appl. No.: 11/483,928

(22) Filed: Jul. 10, 2006

(65) Prior Publication Data

US 2008/0124960 A1 May 29, 2008

(51) Int. Cl.
*H05K 7/02* (2006.01)
*H02B 1/20* (2006.01)
(52) U.S. Cl. .................................. 174/541; 361/675
(58) Field of Classification Search ............... 174/10, 174/50, 520, 535, 541, 559, 72 B, 71 B, 88 B, 174/70 B, 129 B; 361/675, 600, 601, 611, 361/624, 637, 640, 641, 648; 16/110.1, 221, 16/110; 200/50.2; 292/7
See application file for complete search history.

(56) References Cited

U.S. PATENT DOCUMENTS

| | | | | |
|---|---|---|---|---|
| 2,984,769 | A | * 5/1961 | Turton | 361/675 |
| 3,053,945 | A | * 9/1962 | Harton et al. | 200/16 E |
| 3,354,352 | A | * 11/1967 | Goodridge | 361/675 |
| 4,032,207 | A | 6/1977 | Ericson et al. | |
| 4,957,447 | A | 9/1990 | Hibbert et al. | |
| 5,525,068 | A | * 6/1996 | Graham et al. | 439/114 |

* cited by examiner

*Primary Examiner*—Diego Gutierrez
*Assistant Examiner*—David M Sinclair
(74) *Attorney, Agent, or Firm*—Martin J. Moran

(57) ABSTRACT

The present invention provides busway plug fitting having a housing assembly and a toggle mechanism disposed therein having at least two operatively linked operating handles. A first assembly is disposed on a first side member of the housing assembly and structured to move between a first position and a second position. The second handle assembly is disposed on a second, perpendicular side of the housing assembly and also structured to move between a first position and a second position. The toggle mechanism is coupled to the external coupling construct of the operating device and structured to move between a first position and a second position. The first and second handle assemblies are operatively linked by the toggle mechanism. In this configuration, a user may operate either handle assembly to actuate the operating device disposed with in the busway plug fitting.

10 Claims, 5 Drawing Sheets

US 7,420,132 B2

BUSWAY PLUG FITTING CONTAINING AN OPERATING MECHANISM WITH A REVERSE LINK

BACKGROUND OF THE INVENTION

1. Field of the Invention

The present invention relates to a plug fitting for a busway and, more specifically to a plug fitting having an operating mechanism with two handle assemblies which are coupled by a reverse link.

2. Background Information

A busway may be used to distribute power over an extended length, such as, but not limited to, through multiple floors of a building. The busway typically includes multiple busway sections each having a plurality of conductive members, or buses, disposed in an extruded housing. The housing, typically an aluminum extrusion, acts to support the bus members and to dissipate heat over most of the busway length. That is, the extruded housing is used to protect and support the bus members as the busway extends between floors. At selected locations, there are connector taps extending laterally from the conductive members and through the housing. The connector taps are adapted to be coupled to an operating device disposed within a busway plug fitting.

The busway plug fitting includes a housing assembly structured to enclose an operating device such as, but not limited, to a switch or circuit breaker. The operating device is coupled to, and in electrical communication with, both the busway conductive members and a load device. The operating device has an external coupling construct, such as, but not limited to, an operating handle or a trip bar, structured to actuate the operating device. The busway plug fitting, preferably, includes two handle assemblies, each having an external handle member. Each handle assembly is operatively coupled to the operating device external coupling construct so that a user may actuate the operating device. In the prior art, the external handle members were each coupled to the operating device external coupling construct in a manner so that the handles were rotated in opposite directions of each other. That is, for example, to close the operating device one handle was rotated clockwise and the other handle was rotated counterclockwise. See e.g., U.S. Pat. No. 3,354,352. This is a disadvantage as such a system may confuse a user.

There is, therefore, a need for a busway plug fitting having more than one handle wherein both handles are rotated in the same direction to open or close the operating device.

There is a further need for a busway plug fitting wherein the more than one operating handles are operatively linked.

SUMMARY OF THE INVENTION

These needs, and others, are met by the one embodiment of the disclosed invention which provides a busway plug fitting having a housing assembly and a toggle mechanism disposed therein having at least two operatively linked operating handles. Each handle member is part of a handle assembly. A first handle assembly is disposed on a first side of the housing assembly and structured to move between a first position and a second position. The second handle assembly is disposed on a second, perpendicular side of the housing assembly and also structured to move between a first position and a second position. The toggle mechanism is coupled to the external coupling construct of the operating device and structured to move between a first position and a second position. The first and second handle assemblies are operatively linked by the toggle mechanism. In this configuration, a user may operate either handle assembly to actuate the operating device disposed within the busway plug fitting.

For example, the busway plug fitting may include a circuit breaker having an operating handle structured to move between a first position, wherein the circuit breaker is closed, and a second position, wherein the circuit breaker is open. The toggle mechanism is coupled to the circuit breaker operating handle. Actuation of either toggle mechanism handle assembly causes the toggle mechanism to move between the first and second positions which, in turn, causes the circuit breaker operating handle to move between the first and second position; however, because the handle assemblies are disposed on perpendicular sides of the busway plug fitting housing assembly, the toggle mechanism includes a link assembly having a reverse link structured to translate the motion of one handle assembly into a corresponding motion on the other handle assembly.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
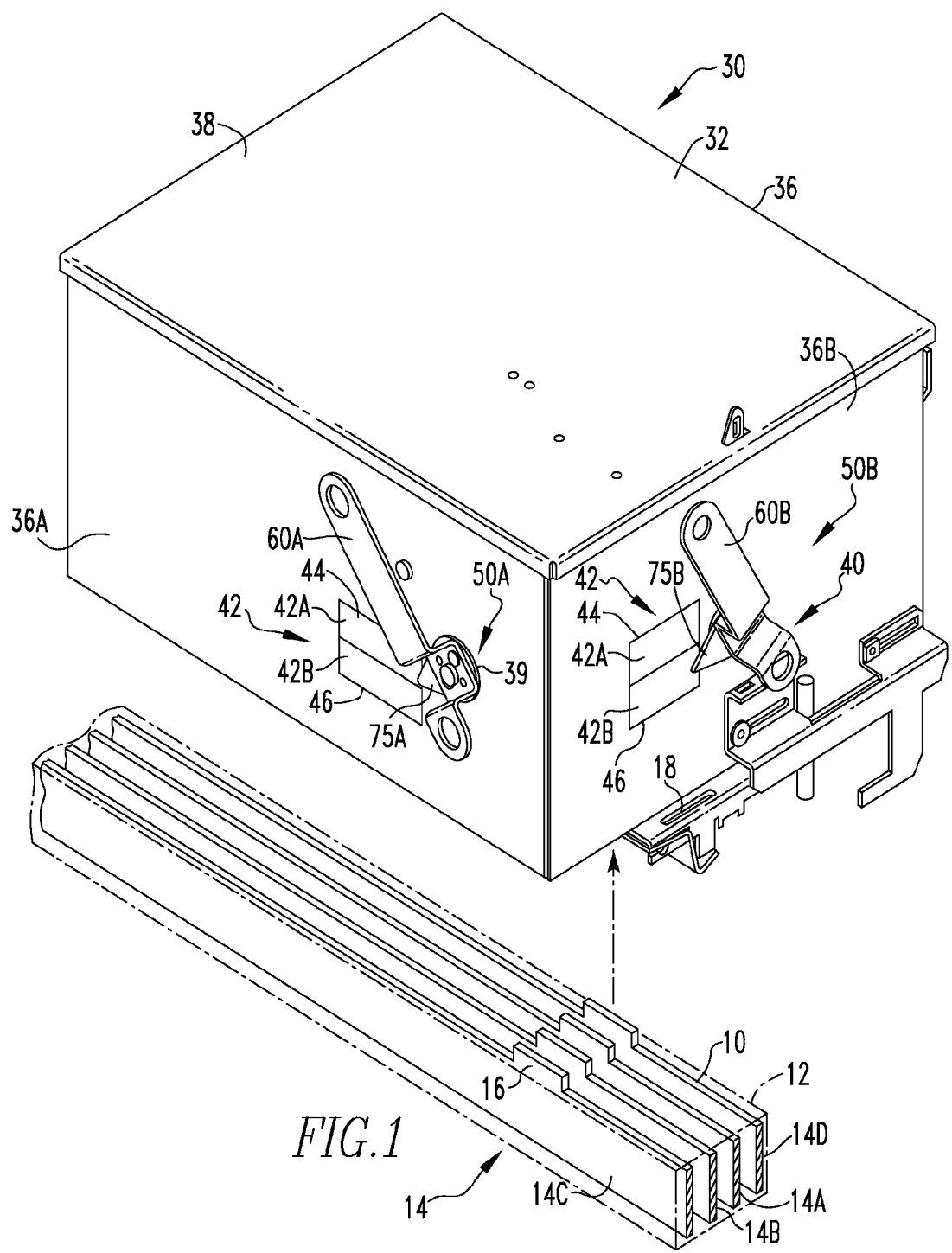
FIG. 1 is an isometric view of a fitting disposed on a busway.

As shown in FIG. 1, a busway 10 includes a casing 12, preferably aluminum, enclosing a plurality of conductive members or bus bars 14. The bus bars 14 are, preferably, flat, elongated members disposed in a parallel stack. Typically, the busway 10 is coupled to a three-phase electrical system (not shown). As such, there are typically three live bus bars 14A, 14B, 14C, and at least one neutral bus bar 14D. At selected locations, the bus bars 14A, 14B, 14C, 14D have connector taps 16 25 extending laterally from the casing 12.

Figure 2:
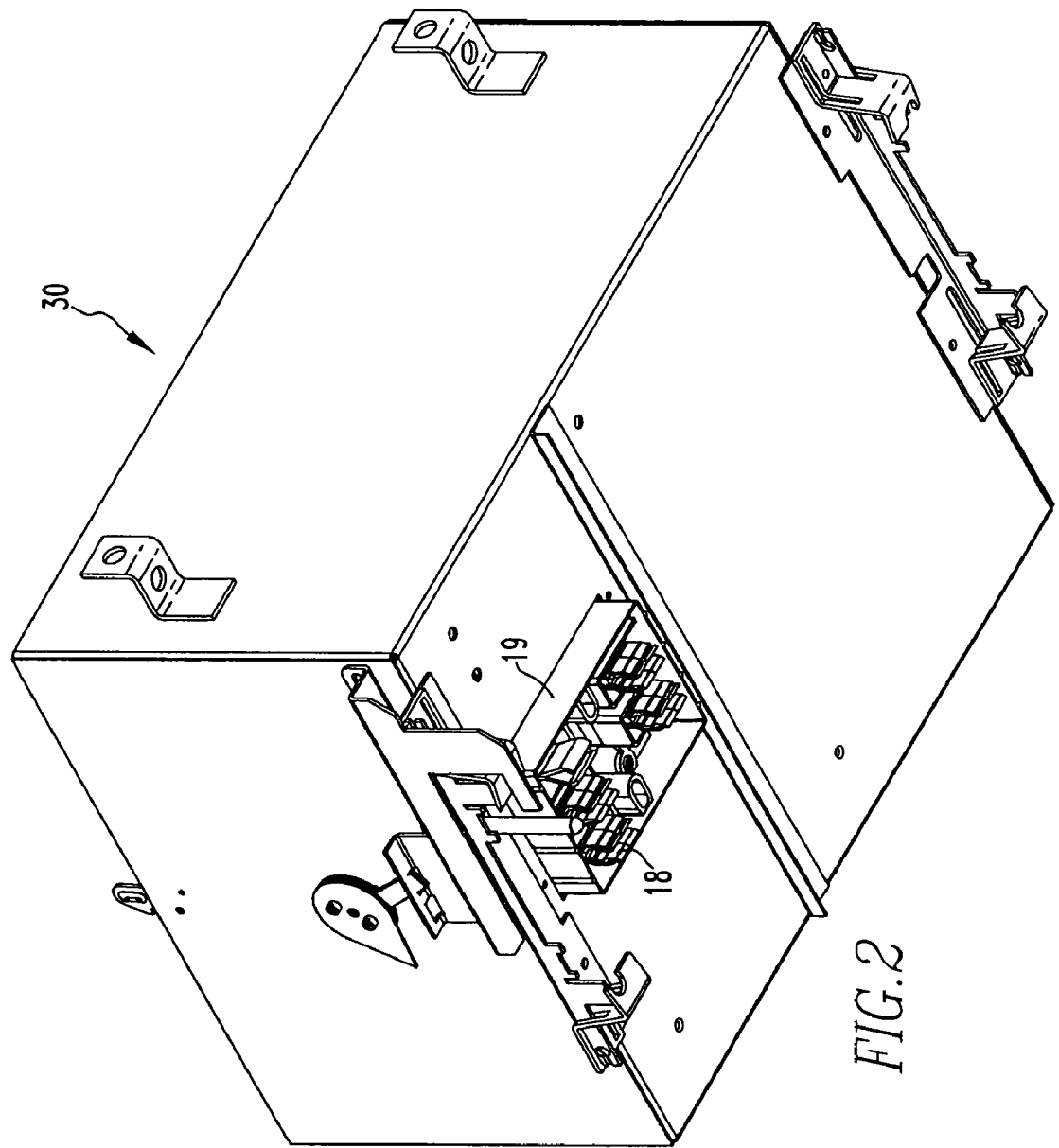
FIG. 2 is a bottom isometric view of the fitting.

Each connector tap 16 is structured to be engaged by, and be in electrical communication with, a stab 18 coupled to an operating device 20. As shown in FIG. 2, the operating device 20, shown as a plurality of circuit breakers 22, each having a fixed contact and a movable contact (not shown), is typically incorporated into the busway plug fitting 30 (described below). The movable contacts are structured to move between a first, closed position and a second, open position. The movable contacts are disposed in a molded, non-conductive housing 25 and are coupled to a operating mechanism 23. The operating mechanism 23 is coupled to an external coupling construct 24, a handle 26 as shown. Actuation of the handle 26 causes the operating mechanism 23 to move the contacts between the two positions. That is, the external coupling construct 24 is structured to move between a first position and a second position corresponding to the position of the movable contacts. The operating device 20 may also include at least one fuse 29. The fuse 29 is disposed between the circuit breaker 22 and an external bus 27. The external bus 27 is structured to be coupled to a load and, as such, the external bus extends outside of the busway plug fitting 30 (described below). Additionally, as shown in FIG. 2, on the bottom side of the housing assembly 30 is a line bus assembly 19. The line bus assembly 19 includes a plurality of stabs 18 that are structured to engage the busway connector taps 16. The stabs 18 are in electrical communication with the operating device 20.

The operating device 20 is structured to be disposed within a busway plug fitting 30. The busway plug fitting 30 is structured to be attached to the elongated busway 10. As shown in FIG. 1, the busway plug fitting 30 includes a housing assembly 32 and a toggle mechanism 34. The housing assembly 32 has a plurality of side members 36 structured to form an enclosure 38. The side members 36 include a first side member 36A and a second side member 36B. The first side member 36A and the second side member 36B extend in perpendicular planes. The first side member 36A and the second side member 36B each have a generally circular mounting opening 39, 40, respectively, in which a handle assembly 50A, 50B (described below) may be mounted. Preferably, adjacent to each mounting opening 39, 40 is an indicia 42 having two portions 44, 46, structured to indicate the status (e.g. off/on) of the operating device 20. The configuration of the indicia 42 is identical for both the first side member 36A and the second side member 36B. That is, as shown, each indicia 42 is disposed to the left of the mounting opening 39, 40 with the "on" indication located above the "off" indication. The indicia 42 are identical because handle members 60A, 60B (described below) move in synchronicity.

Figure 4:
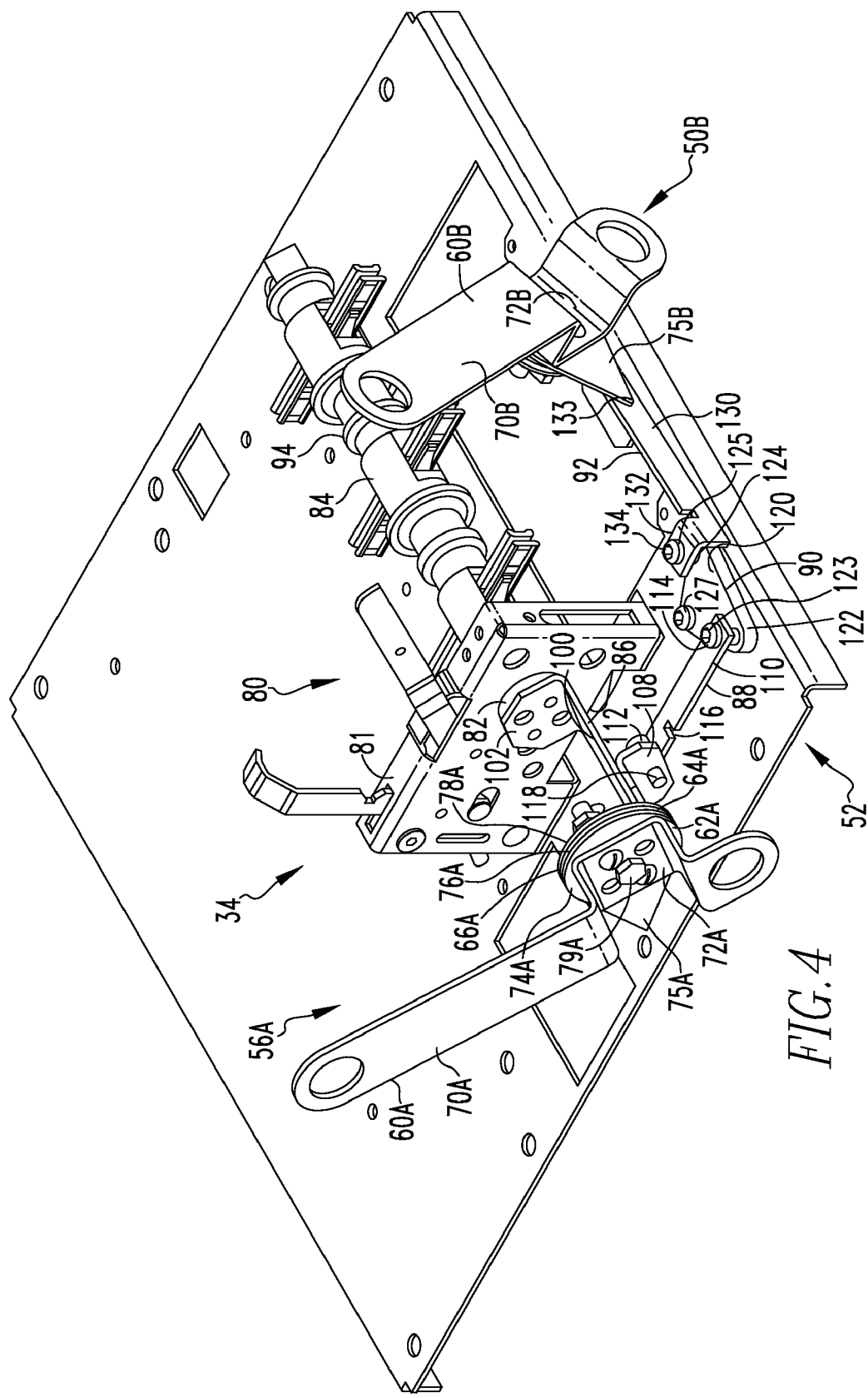
FIG. 4 is a detailed isometric view of the toggle mechanism with the operating devices removed for clarity.
Figure 5:
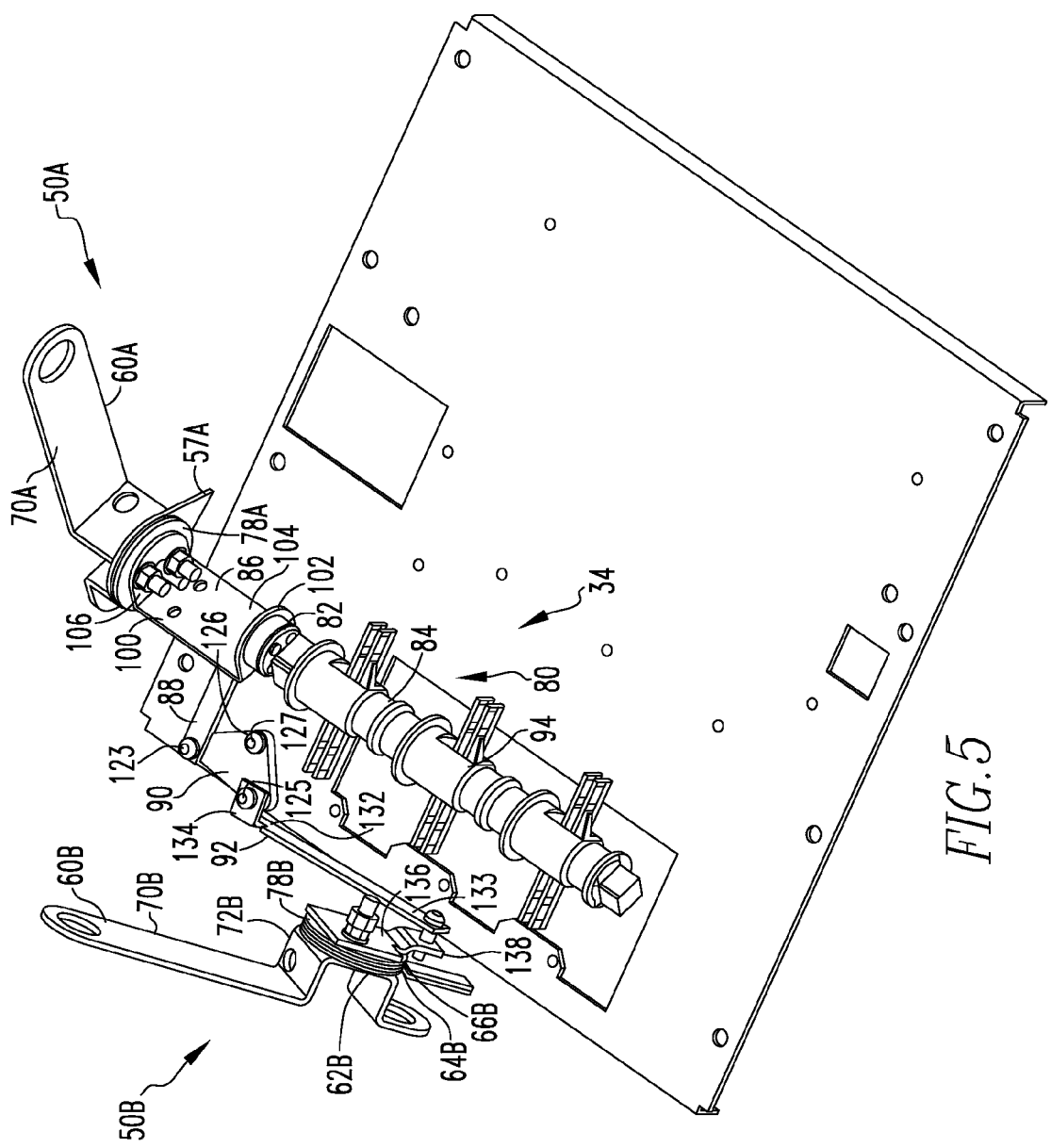
FIG. 5 is another detailed isometric view of the toggle mechanism with the operating devices removed for clarity.

As shown in FIGS. 4 and 5, the toggle mechanism 34 includes a first handle assembly 50A, a second handle assembly 5GB, and a link assembly 52. The first and second handle assemblies 50A, 50B are substantially similar and only the first handle assembly 50A will be described here. Components of the first handle assembly 50A will be identified with a reference number followed by the letter "A." The second handle assembly 50B is understood to have the same components which are identified using the letter "B" after the same reference number. The first handle assembly 50A includes a handle member 60A, a first mounting plate 62A, a spacer 64A, and a second mounting plate 66A. The handle member 60A is a generally flat body 70A having a square, U-shaped offset 72A therein. The base of the offset 72A includes one or more fastener openings. The first mounting plate 62A is a generally flat body 74A having a circular perimeter extending over an arc of about 270 degrees. The diameter of the first mounting plate 62A is larger than the associated mounting opening 39. The remaining portion of the perimeter forms a pointer 75A structured to point to one portion 44, 46 of the indicia 42. The spacer 64A is a generally flat body 76A having a generally circular perimeter. The spacer 64A is sized just smaller than the mounting openings 39, 40. The second mounting plate 66A is also a generally circular body 78A having a diameter larger than the associated mounting opening 39. The first handle assembly 50A is assembled with the second mounting plate 66A disposed inside the enclosure 38 adjacent to the first side member mounting opening 39. The spacer 64A is disposed inside the first side member mounting opening 39. The first mounting plate 62A is disposed outside the enclosure 38 adjacent to the first side member mounting opening 39. The handle member offset 72A is disposed adjacent to the first mounting plate 62A. A fastener 79A extends through the handle member offset 72A, the first mounting plate 62A, the spacer 64A, and the second mounting plate 66A. In this configuration, the first handle assembly 50A is rotatably coupled to the first side member 36A and is structured to move between a first position, wherein the pointer 75A points to the first portion 44 of the indicia 42, and a second position, wherein the pointer 75A points to the second portion 46 of the indicia 42. In a similar manner, the second handle assembly 50B is rotatably couple to the second side member 36B.

Figure 3:
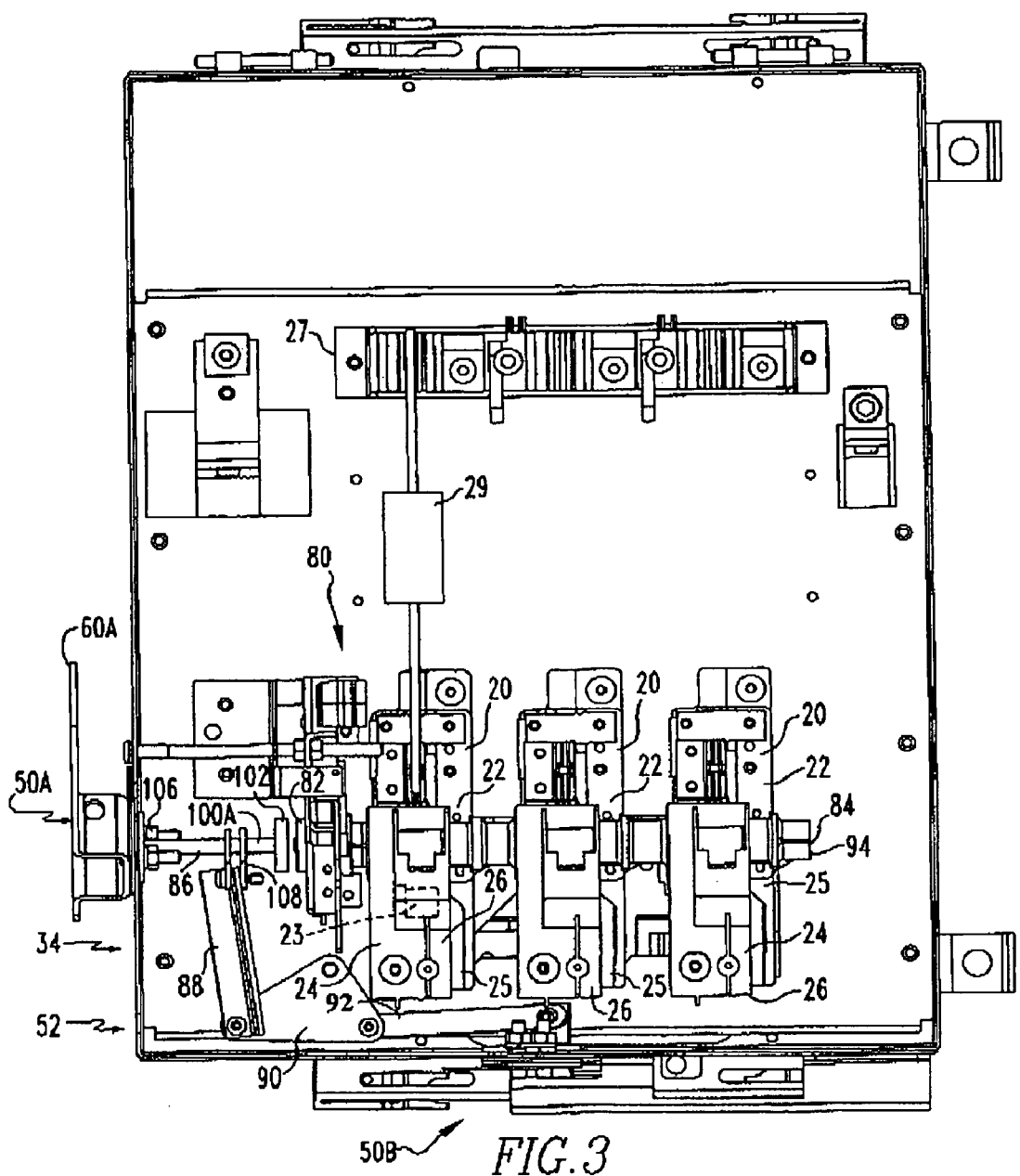
FIG. 3 is a plan view of the interior of the fitting with a plurality of operating devices included.

The link assembly 52 includes an interface assembly 80, an axial link 86, a first link 88, a reverse link 90 and a second link 92. The interface assembly 80 has a mounting assembly 81, a rotating link 82 and an external coupling construct link 84. The mounting assembly 81 is coupled to the housing assembly 32 and extends into the enclosure 38. The external coupling construct link 84 is structured to be coupled to the external coupling construct 24 of the operating device 20 and is shown as an elongated rod 94 rotatably coupled to the mounting assembly 81 and structured to engage a handle 26 on the operating device 20 (FIG.3). The rotating link 82 extends from the mounting assembly 81 and is structured to be coupled to the axial link 86. The rotating link 82 is, preferably, aligned with the axis of rotation of the first handle assembly 50A.

In this configuration, the axial link 86 may be either a U-shaped member 100 (as shown in FIG. 3) or a generally circular rod 100A (as shown in FIG. 2) having a first, perpendicular end, 102, a bight portion 104, and a second perpendicular end 106. Additionally, there is a perpendicular tab 108 extending from the outer side of the bight portion 104. The first perpendicular end 102 is coupled to the rotating link 82. The second perpendicular end 106 is coupled to the first handle assembly second mounting plate 66A. As such, movement of the first handle assembly 50A between a first position and a second position moves the external coupling construct link 84 between a first position and a second position.

The remaining components of the link assembly 52, that is, the first link 88, a reverse link 90 and a second link 92, are structured to couple the second handle assembly 50B to the axial link 86. The first link 88 includes an elongated body 110 having a first end 112 and a second end 114. A flat, perpendicular tab 116 extends from the first end 112. The tab 116 has a perpendicular pivot pin 118 extending therefrom. The pivot pin 118 is pivotally coupled to the axial link perpendicular tab 108. The first link 88 second end 106 is pivotally coupled to the reverse link 90.

The reverse link 90, preferably, includes a generally flat, triangular body 120 having a first corner 122, a second corner 124 and a third corner 126. Preferably, these corners 122, 124, 126 act, respectively, as a first coupling point 123, a second coupling point 125 and a pivot point 127. In this configuration, the pivot point 127 is offset from a line extending between the first coupling point 123 and the second coupling point 125. This configuration may be accomplished with bodies having alternate shapes, for example, a "T" shape (not shown). The reverse link 90 is rotatably coupled to the second side 36B at the pivot point 127. The first coupling point 123 is coupled to the first link 88. The second coupling point 125 is coupled to the second link 92.

The second link 92 has an elongated body 130 with a first end 132 and a second end 133. The second link first end 132 includes a generally perpendicular tab 134. The second link perpendicular tab 134 is pivotally coupled to the reverse link second coupling point 125. The second link second end 133 is pivotally coupled to the second handle assembly 50B. The second handle assembly 50B may include a coupling plate 136 having an extended tab 138 structured to be coupled to the second link second end 133. The coupling plate 136 is coupled to the second handle assembly second mounting plate 66B.

In this configuration, the toggle mechanism 34 is structured to move between a first position and a second position. When the toggle mechanism 34 is in the first position, the operating device external coupling construct 24, the first handle assembly handle member 60A, and the second handle assembly handle member 60B are all in the first position. When a user moves either the first handle assembly handle member 60A, or the second handle assembly handle member 60B into the second position, the link assembly 52 causes the operating device external coupling construct 24, as well as the other operating handle member 60A/B to also move into the second position. Further, in this configuration, both the first handle assembly handle member 60A, and the second handle assembly handle member 60B move in the same rotational direction when moving between the first and second positions.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A busway plug fitting structured to be attached to an elongated busway, said busway having a plurality of rigid, elongated conductive members, said conductive members having side taps extending generally perpendicular to the longitudinal axis of said busway, each said tap structured to be coupled to an operating device, said operating device structured to be coupled to said busway and a load device, said operating device having an operating mechanism with an external coupling construct, said external coupling construct structured to move between a first position and a second position, wherein movement of said external coupling construct between said first position and said second position actuates said operating device, said busway plug fitting comprising:
  a housing assembly having a plurality of side members structured to form an enclosure, said side members including a first side member and a second side member, said first side member and said second side member extending in perpendicular planes;
  a toggle mechanism coupled to said housing assembly and structured to engage said external coupling construct said toggle mechanism structured to move between a first position and a second position, said toggle mechanism having a first handle assembly and a second handle assembly, said first handle assembly disposed on said first side and said second handle assembly disposed on said second side, said first handle assembly is structured to move between a first position and a second position, said first handle assembly coupled to said external coupling construct so that when said first handle assembly is in said first position, said external coupling construct is also in said first position and when said first handle assembly is in said second position, said external coupling construct is also in said second position;
  said second handle assembly is structured to move between a first position and a second position, said second handle assembly coupled to said external coupling construct so that when said second handle assembly is in said first position, said external coupling construct is also in said first position and when said second handle assembly is in said second position, said external coupling construct is also in said second position;
  wherein said first handle assembly and said second handle assembly rotate in the same direction when moving between said first position and said second position;
  wherein said toggle mechanism includes a link assembly, said link assembly structured to couple said first handle assembly and said second handle assembly so that when said first handle assembly is in said first position, said second handle assembly is in said first position, and, when said first handle assembly is in said second position, said second handle assembly is in said second position; said toggle mechanism includes an interface assembly having a rotating link and an external coupling construct link;
  said external coupling construct link structured to engage said external coupling construct;
  said rotating link structured to move between a first position and a second position;
  said external coupling construct link structured to move between a first position and a second position;
  wherein, when said rotating link is in said first position, said external coupling construct is in said first position and when said rotating link is in said second position, said external coupling construct is in said second position,
  said link assembly includes an axial link, a first link, a reverse link, and a second link;
  said axial link coupled to both, and extending between, said rotating link and said first handle assembly;
  said first link rotatably coupled to both, and extending between, said axial link and said reverse link; and
  said second link rotatably coupled to both, and extending between, said reverse link and said second handle assembly.

2. The busway plug fitting of claim 1 wherein said reverse link is rotatably coupled to said second side member.

3. The busway plug fitting of claim 2 wherein said reverse link has a first coupling point, a second coupling point and a pivot point;
  said pivot point being offset from a line extending between said first coupling point and said second coupling point;
  said first link coupled to said reverse link at said first coupling point; and
  said second link coupled to said reverse link at said second coupling point.

4. The busway plug fitting of claim 3 wherein:
  said first handle assembly is rotatably coupled to said first side member; and
  said first handle assembly axis of rotation is generally aligned with said rotating link axis of rotation.

5. The busway plug fitting of claim 3 wherein:
  said first handle assembly includes a pointer,
  said housing assembly first side member has an indicia disposed adjacent to said first handle assembly;
  said second handle assembly includes a pointer;
  said housing assembly second side member has an indicia disposed adjacent to said second handle assembly; and
  wherein the configuration of the indicia on said first and second side members is generally identical.

6. A busway plug fitting structured to be attached to an elongated busway, said busway having a plurality of rigid, elongated conductive members, said conductive members having side taps extending generally perpendicular to the longitudinal axis of said busway, each said tap structured to be coupled to an operating device, said busway plug fitting comprising:
  an operating device structured to be coupled to said busway taps and to a load device, said operating device having an operating mechanism with an external coupling construct;
  said external coupling construct structured to move between a first position and a second position, wherein movement of said external coupling construct between said first position and said second position actuates said operating device;

a housing assembly having a plurality of side members structured to form an enclosure, said side members including a first side member and a second side member, said first side member and said second side member extending in perpendicular planes;

a toggle mechanism coupled to said housing assembly and structured to engage said external coupling construct, said toggle mechanism structured to move between a first position and a second position, said toggle mechanism having a first handle assembly and a second handle assembly, said first handle assembly disposed on said first side and said second handle assembly disposed on said second side, said first handle assembly is structured to move between a first position and a second position, said first handle assembly coupled to said external coupling construct so that when said first handle assembly is in said first position, said external coupling construct is also in said first position and when said first handle assembly is in said second position, said external coupling construct is also in said second position;

said second handle assembly is structured to move between a first position and a second position, said second handle assembly coupled to said external coupling construct so that when said second handle assembly is in said first position, said external coupling construct is also in said first position and when said second handle assembly is in said second position, said external coupling construct is also in said second position;

wherein said first handle assembly and said second handle assembly rotate in the same direction when moving between said first position and said second position;

wherein said toggle mechanism includes a link assembly, said link assembly structured to couple said first handle assembly and said second handle assembly so that when said first handle assembly is in said first position, said second handle assembly is in said first position, and, when said first handle assembly is in said second position, said second handle assembly is in said second position;

said toggle mechanism includes an interface assembly having a rotating link and an external coupling construct link;

said external coupling construct link structured to engage said external coupling construct;

said rotating link structured to move between a first position and a second position;

said external coupling construct link structured to move between a first position and a second position;

wherein, when said rotating link is in said first position, said external coupling construct is in said first position and when said rotating link is in said second position, said external coupling construct is in said second position, said link assembly includes an axial link, a first link, a reverse link, and a second link;

said axial link coupled to both, and extending between, said rotating link and said first handle assembly;

said first link rotatably coupled to both, and extending between, said axial link and said reverse link; and said second link rotatably coupled to both, and extending between, said reverse link and said second handle assembly.

7. The busway plug fitting of claim 6 wherein said reverse link is rotatably coupled to said second side member.

8. The busway plug fitting of claim 7 wherein said reverse link has a first coupling point, a second coupling point and a pivot point;

said pivot point being offset from a line extending between said first coupling point and said second coupling point;

said first link coupled to said reverse link at said first coupling point; and said second link coupled to said reverse link at said second coupling point.

9. The busway plug fitting of claim 8 wherein:

said first handle assembly is rotatably coupled to said first side member; and said first handle assembly axis of rotation is generally aligned with said rotating link axis of rotation.

10. The busway plug fitting of claim 8 wherein:

said first handle assembly includes a pointer, said housing assembly first side member has an indicia disposed adjacent to said first handle assembly;

said second handle assembly includes a pointer;

said housing assembly second side member has an indicia disposed adjacent to said second handle assembly; and wherein the configuration of the indicia on said first and second side members is generally identical.

* * * * *